United States Patent [19]

van Heijst

[11] 4,279,047
[45] Jul. 21, 1981

[54] FLUID TRANSFER BUOY

[75] Inventor: Willem J. van Heijst, Monaco, Monaco

[73] Assignee: Bluewater Terminal Systems N.V., Curaco, Netherlands Antilles

[21] Appl. No.: 4,343

[22] Filed: Jan. 18, 1979

[51] Int. Cl.³ .......................................... B63B 21/52
[52] U.S. Cl. ........................................................ 9/8 P
[58] Field of Search .................... 9/8 R, 8 P; 114/230; 141/387, 388

[56] References Cited
U.S. PATENT DOCUMENTS

| B 379,955 | 1/1975 | Versluis et al. | 9/8 P |
|---|---|---|---|
| 3,414,918 | 12/1968 | Petrie et al. | 9/8 P |
| 3,651,525 | 3/1972 | Rutten et al. | 9/8 P |
| 3,735,435 | 5/1973 | Mikulicic et al. | 9/8 P |
| 4,042,990 | 8/1977 | Donaldson, Jr. | 9/8 P |

Primary Examiner—Trygve M. Blix
Assistant Examiner—Jesus D. Sotelo
Attorney, Agent, or Firm—Arnold, White & Durkee

[57] ABSTRACT

A fluid transfer buoy is disclosed for transfer of fluids between a pipeline on the sea floor and a moored vessel through a swivel fluid transfer connection. The buoy includes a frame structure which houses a central fluid transfer line terminating in a central fluid swivel connection, and a surrounding buoyancy chamber which is bearing mounted to freely rotate about a central shaft of the frame. The rotatable nature of the buoyancy chamber results in no relative movement between the swiveling portion of the fluid transfer line and the deck of the buoy, enabling the entirety of the structure to be surrounded by a protective fender and further making the use of polygonal buoy shapes more feasible. The bearing is protected from sea water intrusion from above and below, and is accessible from the buoy deck to facilitate on site bearing maintenance.

7 Claims, 4 Drawing Figures

FLUID TRANSFER BUOY

BACKGROUND OF THE INVENTION

The present invention relates generally to a novel apparatus for mooring a vessel floating on the surface of a body of water to the floor or seabed beneath that body of water by means of a single point mooring. More particularly, the present invention relates to a fluid transfer buoy that comprises a frame with a load carrying shaft, a buoyancy chamber freely rotatable around the load carrying shaft, pipes and conduits for transfer of fluids or gasses to or from a vessel moored to the single point mooring, and catenary-type anchor arrangements to moor the apparatus permanently at an offshore location in the vicinity of the pipeline.

A common form of single point mooring is a buoy floating on the surface of a body of water and anchored at anchor points to the floor of that body of water with a number of anchor chains. It has been found that the number of anchor chains required for suitable mooring is minimally three but can be as many as twelve. A typical design is shown in U.S. Pat. No. 3,365,734. A flexible pipe terminates at the buoy and connects the buoy with the pipeline on the floor of the body of water. On top of the buoy there is mounted a turntable supported by a bearing which turntable rotates relative to the deck of the buoy. Mounted concentrically with the turntable is a fluid swivel which is of course in fluid communication with the terminus of the flexible pipe leading to the vessel at one end, and the seafloor pipeline at the other end. The combination of turntable and swivel can rotate freely about the vertical axis of the buoy to accommodate the motion of the moored ship in response to tide, wind and current.

With this known arrangement, the vessel is moored to the buoy with ropes, and a floating hose connects the fluid swivel on the turntable of the buoy with the vessel piping. With such an apparatus, a fluid connection between pipeline on the floor of the body of water and the vessel piping is established that allows free rotation of the vessel around the single point mooring for transfer of gases or liquids.

The prior art bearing arrangement between buoy and turntable is either by a set of bogie wheels running over a rail, or a single large-diameter roller bearing with three roller paths to resist against radial, axial and tipping moments. Since the turntable carries the floating hoses and mooring ropes, the turntable has to have extensions protruding over the buoy body usually at the water line. The rotating turntable typically dictates that the buoy have a circular shape; otherwise the fluid connections would overhang the edge of the buoy significantly in some positions.

The protruding overhanging turntable elements are susceptible to damage from the moored vessel, or from supply of work vessels. It is also difficult to provide an adequate fendering around the buoy, since this would require even larger and longer protruding parts. The overhanging character of the floating hose pipe connection makes the interconnection between the hose and the pipe cumbersome, since the maintenance crew cannot be provided with overhanging platforms or railings, and further since workmen must be constantly watchful of the relative movement of the turntable relative to the buoy deck.

Disadvantages exist in the prior art also with respect to the bearing arrangements which have been used. Bogie wheels are simple to repair, but the corrosive atmosphere in the splashzone area makes severe corrosion of the rail inevitable. This is not readily solved by using a corrosion-resisting material such as plastic for the rail, since these are generally too soft to act as a rail material. The continuous overrolling of the bogie wheels on the rail under load increases the corrosion effect. The acceptable load levels of bogie wheels over rails is limited, and in order to obtain sufficient wheels in contact with the rail to spread the load, a large rail diameter has to be chosen, preferably at or near circumference of the buoy. Buoy-kissing between vessel and buoy makes this arrangement very sensitive to deformation of the rail, which could hamper the rotation of the turntable.

A roller bearing with the same strength can have a much smaller diameter, since more roller bearings are carrying the load in a lubricated environment. The smaller diameter means the bearing may be centrally located on the buoy making it more safe against deformation in case of a severe collision between a vessel and the buoy. A difficulty presented by such a bearing is the protection against water ingress and corrosion. It is known that maintenance is often very difficult at exposed offshore locations, and good seal protection is almost impossible to realize on large diameters. In case of a turntable rotating over a buoy body, it is difficult to achieve a satisfactoy sea water seal between the turntable and the buoy deck to prevent intrusion of sea water into the bearing when rough seas cause waves to break over the buoy.

SUMMARY OF THE INVENTION

The fluid transfer buoy of the instant invention overcomes a number of these disadvantages. Rather than use a turntable to support the fluid transfer lines to rotate above and relative to the buoy deck, the apparatus of this invention provides a buoy in which the entire buoyancy chamber is rotatable around the central shaft of a frame attached from its underside to the sea floor by anchor lines or chains. Thus, fluid transfer lines on or above the deck move with the buoyancy chamber in response to vessel motion.

The fluid transfer buoy of this invention accordingly comprises a frame having a central load bearing shaft housing a central fluid carrying conduit, and having means on the underside of the frame to achieve connection with anchor lines extending to the sea floor. A buoyancy chamber, which may be polygonal in shape, has an annular opening which accommodates the shaft centrally through the buoyancy chamber. A bearing, for example, a three roller race bearing at a position above the buoy water base supports the buoyancy chamber for rotation about the central shaft of the frame. A standard swivel connection is provided between the central fluid conduit and the transfer conduits extending across the deck of the buoy to a fixed coupling on the buoy body for interconnection with the floating hoses extending to the moored vessel.

The bearing and preferably the swivel connection, are disposed above the waterline of the buoy and are protected by an enclosing shed on the buoy deck from waves which overrun the buoy. Below the bearing a surge chamber or volume between the central shaft of the frame and the buoyancy chamber is provided with a restricted below-waterline opening which effectively prevents sea water from surging to the level of the bearing in the roughest of seas.

For bearing maintenance, means are provided to temporarily immobilize the buoyant chamber with respect to the central shaft, enabling a workman to repair or replace elements of the bearing from the deck.

A protective fender may surround the entirety of the buoy including the coupling between the swiveling above deck conduits and the floating lines extending to the moored vessel.

DESCRIPTION OF THE DRAWINGS

The structure and operation of the buoy of the instant invention will be described with reference to the following drawings, wherein like reference numbers have been applied to like elements.

DESCRIPTION OF A SPECIFIC PREFERRED EMBODIMENT

Figure 1:
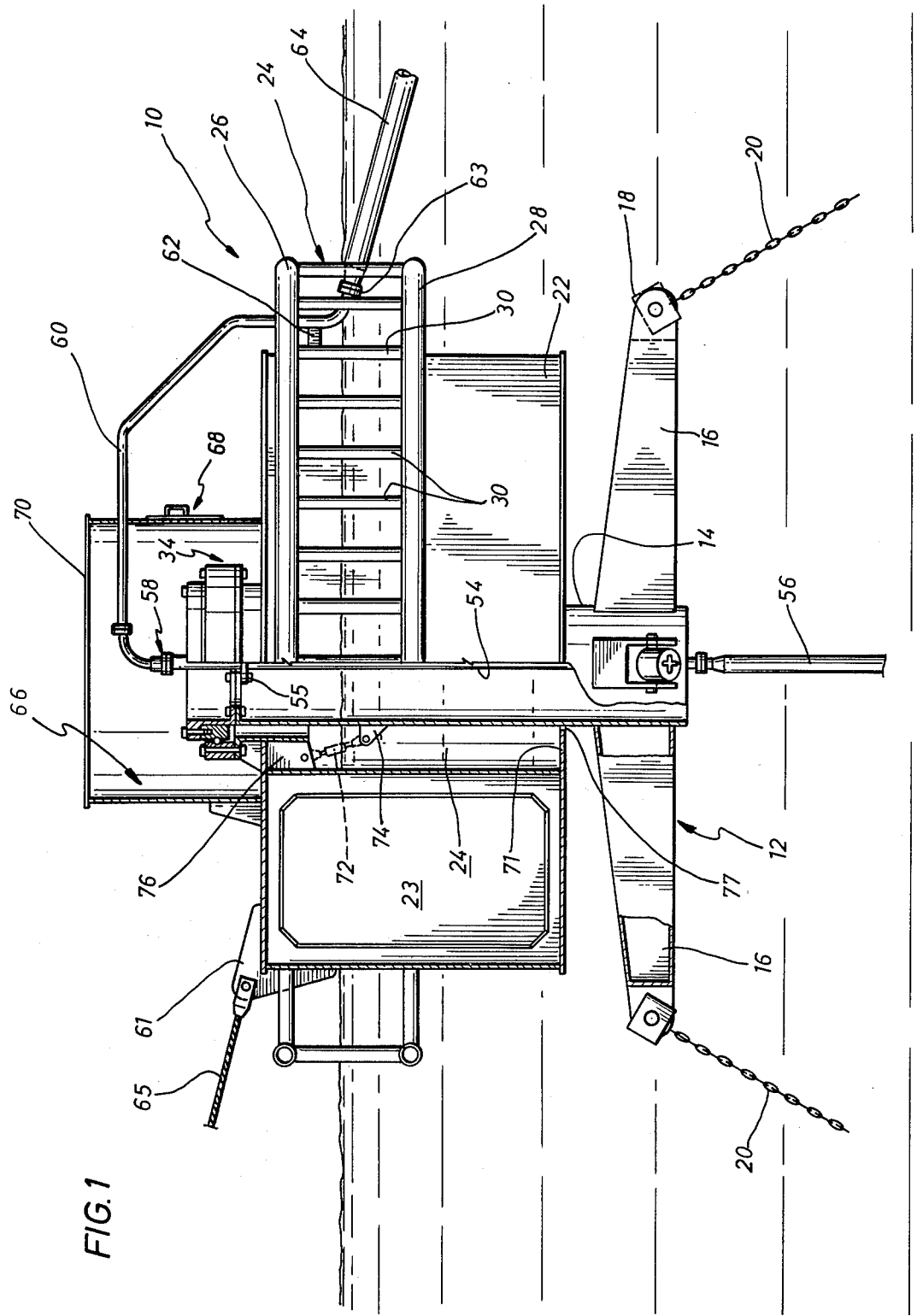
FIG. 1 is a side elevation view of a buoy embodiment in accordance with this invention showing a partial section of the buoyancy chamber and the central shaft of the frame.

Referring to FIG. 1, a side view of a preferred embodiment of the instant invention is shown. The left hand portion of the buoy is shown in section view.

The buoy 10 comprises a frame 12 having an upper vertically extending shaft 14. The lower portion of shaft 14 supports four outwardly extending arms 16 disposed at relative angles of 90 degrees to each other. Each arm terminates in a chain stopper or pivoting shackle 18 to which catenary anchor chains 20 may be affixed to secure position of the buoy. As discussed above, mooring buoys have utilized from three to as many as twelve anchor chains, and equally spaced arms may be provided to accommodate the number of anchor chains to secure the buoy. Other securing arrangements may also be used, although it will be understood that the anchor chains 20 must be secured to the frame 12 and not the buoyancy chamber. Hence it is preferred to have the anchor points displaced outwardly from the central shaft of the buoy but within the protection of the fender as with the arms 16 that are illustrated, rather than have a single or closely spaced multiple shackle points at the lower part of shaft 14.

The buoy 10 comprises a buoyancy chamber 22 which has a central annular opening 24. As may be seen in FIG. 2, the buoyancy chamber has basically a square configuration. Such a construction is cheaper to produce than the typical round buoy shape. It will be understood that the buoy of this invention may have any desired polygonal shape, and may correspond generally to a triangle, square, hexagon or the like. Indeed, the buoy may utilize a rectangular shape or a star-type configuration if desired. Since the buoyancy chamber rotates with the buoy, any desired configuration may be used.

The interior of the buoyancy chamber may be provided with strengthening bulkheads (not shown) and furthermore is preferably divided into a plurality of water-tight compartments for safety. Four water-tight compartments 23 in the illustrated embodiment may be filled with foam or other buoyancy material for additional safety.

Figure 2:
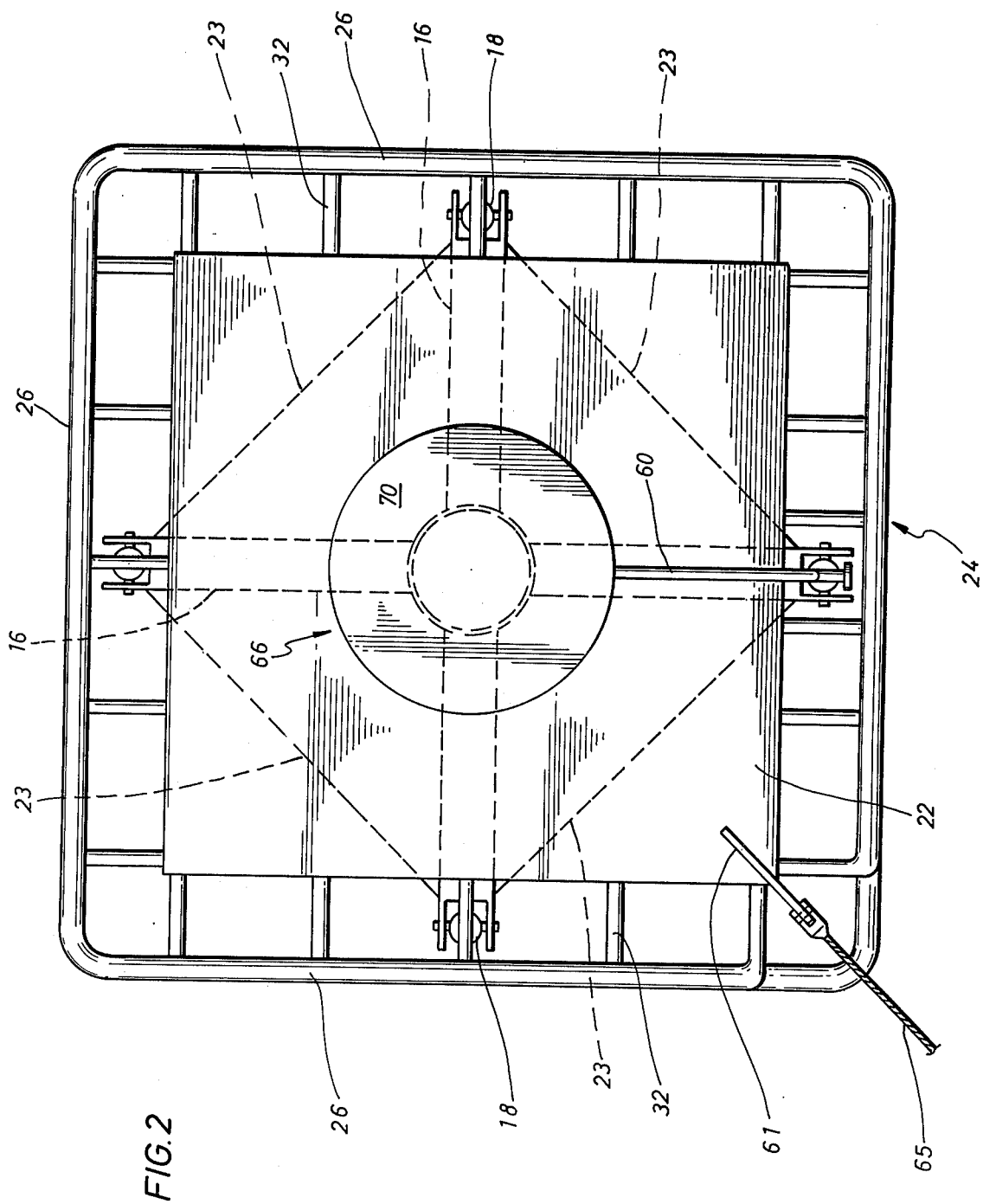
FIG. 2 is a top view of the buoy shown in FIG. 1.

An outer protective fender 24 surrounds the perimeter of the buoyancy chamber and preferably extends outboard of all other structure on the buoy, including the anchoring arms 16. The fender illustrated extends partially below the water line of the buoy to provide complete protection. The fender illustrated comprises upper and lower buoy encircling members 26 and 28 respectively joined by a plurality of vertical members 30. The entirety of the fender is supported outboard of the buoyancy chamber by fender supports 32 (FIG. 2).

Figure 3:
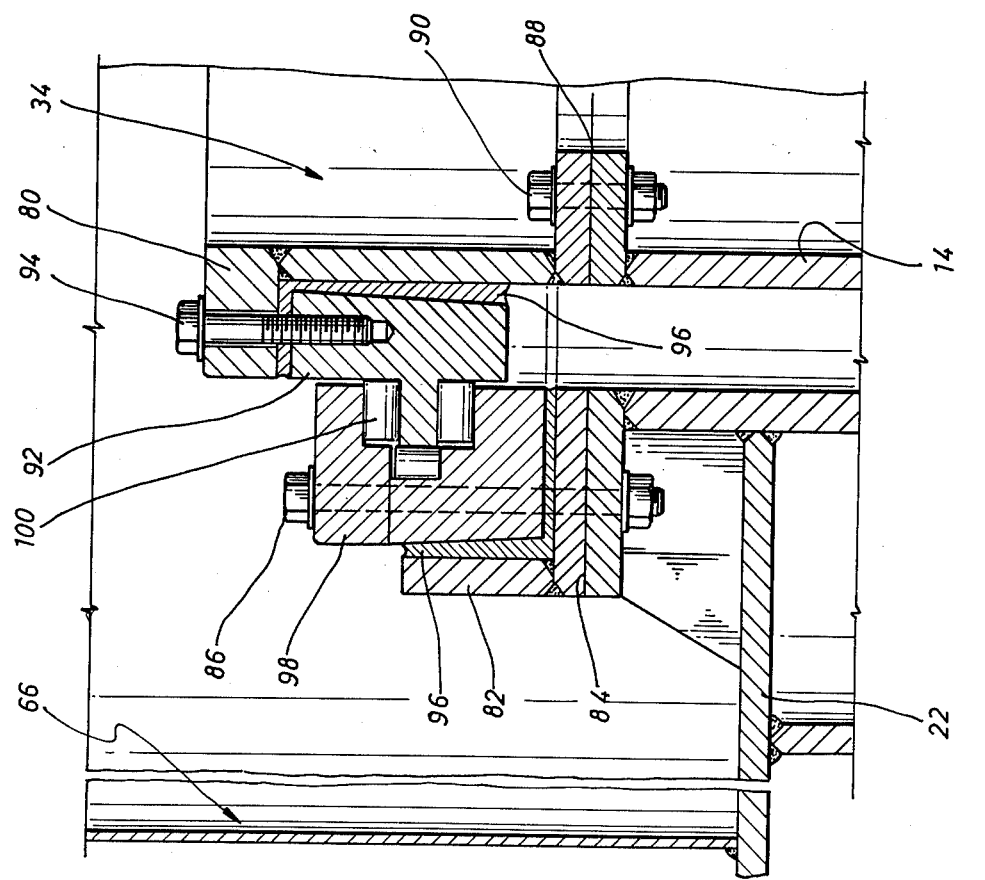
FIG. 3 is an exploded section showing a preferred multiple roller bearing configuration.

The buoyancy chamber 22 is coupled to shaft 14 for rotation about the shaft by bearing 34. The bearing, shown schematically in FIG. 1 and an additional detail in FIG. 3, is a three-roller race bearing which is itself known in the art. Such a bearing is well suited to accept the vertical, horizontal and tilting forces which will be encountered between the buoyancy chamber and the shaft.

It will be noted that the bearing 34 is above the waterline of the buoy and is protected from sea water intrusion as will be explained further below. The bearing itself may be seen in greater detail in FIG. 3 and comprises a three-roller bearing to provide resistance against tipping movements, radial loads and axial loads between the shaft 14 and the buoy body 22. This bearing 34 is of conventional construction known to those persons skilled in the art. There is provided an inner mounting ring 80 and an outer mounting ring 82. The outer mounting ring 82 is connected to the buoy body 22 at an outer flange connection 84 by means of an outer flange bolt 86. The inner mounting ring 80 is connected to the shaft at an inner flange connection 88 by means of a inner flange bolt 90. A shaft bearing 92 is attached by a shaft bearing bolt 94 and an epoxy resin 96 to the inner mounting ring 80, and a buoy body bearing member 98 is attached by the outer flange bolt 86 and epoxy resin 96 to the outer mounting ring 82.

The rollers 100 are maintained in a lubricated environment and are provided with appropriate seals (not shown) which are typical in the art.

Although a three roller race bearing is illustrated and is preferred, any suitable bearing arrangement to support the buoyancy chamber for rotation about shaft 14 may be used. Indeed a bogie wheel arrangement could be employed. As will be understood, the above-waterline position of the bearing together with the protection afforded by the overall design should enable use of various suitable bearings with minimum danger of corrosion from intrusion of sea water.

Figure 4:
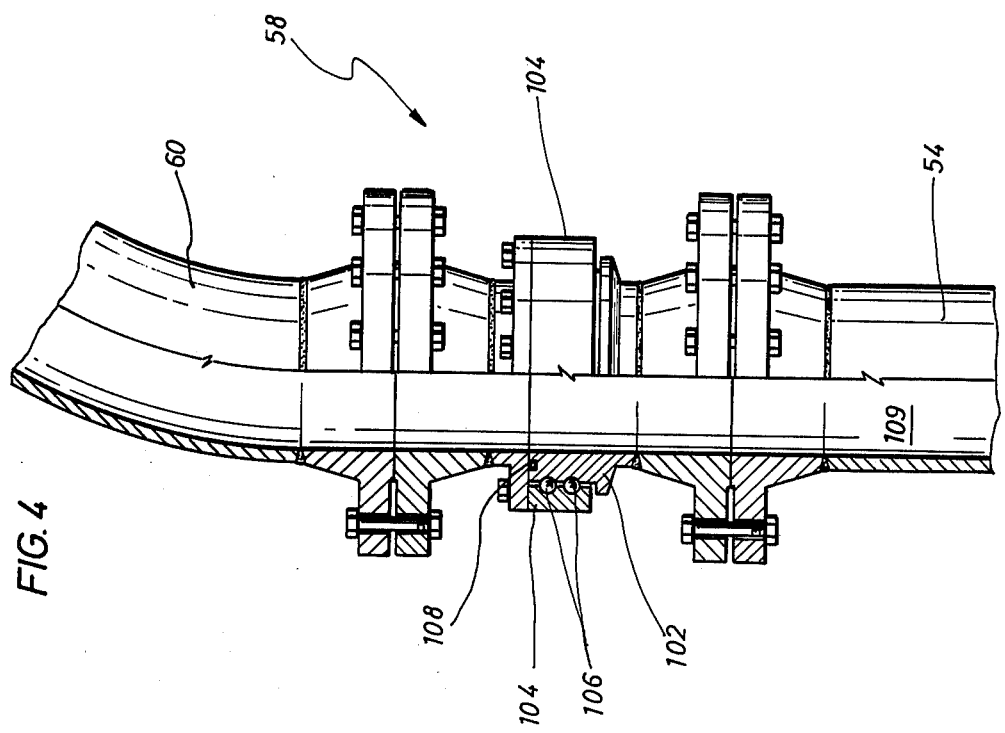
FIG. 4 is a sectional view of a suitable swivel connection which may be used.

A central fluid transfer line 54 is supported within shaft 14. At its lower terminus line 54 is connected to pipeline 56 which would typically interconnect with a fluid transfer manifold on the sea floor. The upper portion of line 54 is connected to the load carrying shaft by means of a flange connection 55 and is further provided with swivel connection 58 illustrated in further detail in FIG. 4.

As may be seen from the drawing, the fluid swivel connection 58 includes an inner housing 102 and an outer housing 104 which may rotate around each other by means of two sets of rollers 106. A seal 108 is provided which prevents fluid passing through the interior 109 of the connection 58 from leaking.

The above-deck portion 60 of the transfer line may then swivel about line 54 with the rotation of the buoyancy chamber 22. Line 60 is fixed by an outboard support 62 with the fender for connection near the water line of the buoy with floating hoses 64 which communicate with the moored vessel (not shown). It will be understood that line 60 may extend at deck level and be affixed to the deck of the buoyancy chamber if desired. Further, a work platform may be provided within fender 24 at the point of connection 63 of line 60 with the floating hoses 64 to facilitate such connection by workmen.

One or more mooring shackle plates 61 for connection with lines 65 to the moored vessel may be provided on the buoy deck or on the periphery of the buoyancy chamber within fender 24. It will be noted that the position of the mooring lines 65 is displaced from the connection point of the floating hoses to avoid fouling of these lines.

The center of the buoy top is closed off with a watertight housing or shed 66 enclosing the main swivel bearing 34 and fluid swivel 58. Maintenance can be done by entering this chamber via a manhole 68. This chamber protects the bearing and swivel fully from overrunning seawater and improved protection of these critical elements is provided. The roof 70 of shed 66 is also preferably removable to facilitate maintenance.

One of the advantages of the apparatus with a rotating buoy body is that the largest volume and mass is the rotating buoy, so a severe bump will have minimal adverse effect on the loading of the main roller bearing. Nevertheless, the design of the buoy allows for the exchange of the main bearing from the deck without the need of large maintenance vessels.

The load carrying shaft 14 can be immobilized within the buoy during maintenance by means of turnbuckles such as 72 and adjustment bolts which may be affixed between a plurality of shackle plates or pad eyes 74 and 76 located respectively on the inner periphery of annular opening 24 and on the outer diameter of shaft 14. As noted above, the bearing 34 itself is mounted on independent support rings 80 and 82 on both its inside and outside diameter, so that it can be disconnected with its seatings as illustrated in FIG. 3. A new bearing can be fitted on the old seatings which will fit in their original position, because the central shaft and bearing arrangement can be adjusted with the bolts 86, 90 and 94.

Between the load carrying shaft and the buoy body is the large diameter annular-shaped chamber 24 for access and inspection. This chamber is provided with a plate 71 which provides a small clearance below-waterline opening 77, which restrict water passage in and out of the chamber during heaving of the buoy. The natural heave frequency motion of the buoy is estimated to be 6 seconds. The volume of the chamber between load carrying shaft and buoy body is approximately 14 m$^3$. A clearance of 1" provides a water entry/exit area of 0.15 m$^2$. The average maximum speed of the water is about 8 m/sec. due to the pressure difference in the gap, so a total maximum volume of 3.6 m$^3$ of water ($8 \times 0.15 \times 3 = 3.6$ m$^3$) will enter the chamber. The volume above the water line is significantly greater and hence the sea water does not reach the bearing level, and underside protection against water is provided.

Prior art type buoys with turntables have a relatively high center of gravity in relation to their center of buoyancy, since a turntable is a relatively heavy construction compared to the construction of the buoy body. If chains are attached to the bottom of the buoy, this stability becomes unimportant when the buoy is in position; but during transport and installation, the stability of the buoy is important. In order to have a minimum volume of buoy which has a direct effect on the level of the mooring forces, usual design suggests a relatively large buoy with a small diameter. A buoy with a turntable on top, however, needs a larger diameter to obtain stability from its shape during transport and installation. The apparatus of this invention, with load carrying shaft extending under the buoy, has its heaviest parts under the waterline, and consequently the stability of the buoy during transport is improved. Therefore, the diameter of the buoy in relation to its height can be optimized further, which not only results in lower mooring forces but also in lower construction cost.

The foregoing description of the invention has been directed to a particular preferred embodiment in accordance with the requirements of the Patent Statutes and for purposes of explanation and illustration. It will be apparent, however, to those skilled in this art that many modifications and changes in both apparatus and method may be made without departing from the scope and spirit of the invention. For example, various arrangements for the central fluid swivel connection and the bearing between the central shaft and the buoy body are contemplated. Moreover, the geometry of the buoy body may be a complex polygonon of virtually any shape. These, and other modifications of the invention will be apparent to those skilled in this art. It is the applicant's intention in the following claims to cover all such equivalent modifications and variations which fall within the true spirit and scope of the invention.

What is claimed is:

1. A fluid transfer buoy for transferring fluid materials to and from a vessel moored thereto comprising:
   a frame having a load-bearing shaft;
   connection means comprising a lower portion of said frame for connecting said buoy to anchor lines extending to a sea floor;
   a buoyancy chamber having an opening therein arranged to receive said load-bearing shaft;
   a bearing operable to support said buoyancy chamber for rotation about said load-bearing shaft, said buoyancy chamber being operable to buoyantly support said bearing above the surface of a body of water and said buoyancy chamber being operable to rotate about said frame when said frame is connected to anchor lines;
   an annular zone defined by an outer surface of said load-bearing shaft and an inner surface of said buoyancy chamber; and
   restriction means for restricting fluid flow into said annular zone, said annular zone and said restriction means being cooperable to dampen the heaving motion of water in said zone.

2. The fluid transfer buoy of claim 1 and further comprising:
   first conduit means attached to said frame, said first conduit means having an upper end and a lower end;
   second conduit means attached to said buoyancy chamber, said second conduit means having a first end and a second end;
   swivel coupling means for connecting said upper end of said first conduit means to said first end of said second conduit means;
   said lower end of said first conduit being connectable to a subsea riser;
   said second end of said second conduit being connectable to a vessel pump system; and said second conduit being further operable to rotate with said buoyancy chamber about an axis of said load-bearing shaft.

3. The fluid transfer buoy of claim 1 wherein said buoyancy chamber is polygonal.

4. The fluid transfer buoy of claim 1 and further comprising a fender positioned outboard of a periphery of said buoyancy chamber.

5. The fluid transfer buoy of claim 1 including means for interconnecting said buoyancy chamber to a vessel.

6. The fluid transfer buoy of claim 1 and further comprising an enclosure carried by said buoyancy chamber for enclosing said bearing.

7. A fluid transfer buoy for transferring fluid materials to and from a vessel moored thereto comprising:
 a frame having a load-bearing shaft;
 connection means comprising a lower portion of said frame for connecting said buoy to anchor line extending to a sea floor;
 a buoyancy chamber having an opening therein arranged to receive said load-bearing shaft;
 a bearing operable to support said buoyancy chamber for rotation about said load-bearing shaft, said buoyancy chamber being operable to buoyantly support said bearing above the surface of a body of water and said buoyancy chamber being operable to rotate about said frame once said frame is connected to anchor lines; and
 means for preventing relative rotational movement between said buoyancy chamber and said load-bearing shaft.

* * * * *